United States Patent
Quinquis et al.

(10) Patent No.: US 6,243,363 B1
(45) Date of Patent: *Jun. 5, 2001

(54) PROCESS OF SWITCHING TO A SERVER OF CELLS SENT BY A MODULE LINKED TO A LOCAL ACCESS NETWORK FOR MOBILE (STATIONS), AS WELL AS SUCH A NETWORK FOR IMPLEMENTATION OF SAID PROCESS

(75) Inventors: Jean-Paul Quinquis; Olivier Roussel, both of Perros Guirec (FR)

(73) Assignee: France Telecom SA, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,278

(22) Filed: Oct. 8, 1997

(30) Foreign Application Priority Data

Oct. 25, 1996 (FR) .................................................. 96 13289

(51) Int. Cl.[7] .................................................... H04B 7/00
(52) U.S. Cl. ............................................ 370/277; 370/397
(58) Field of Search .................................. 370/331, 332, 370/328, 329, 338, 355, 349, 389, 395, 399, 397, 277

(56) References Cited

U.S. PATENT DOCUMENTS 5,875,185 * 2/1999 Wang et al. ......................... 370/331
5,943,338 * 8/1999 Duclos et al. ....................... 370/395

FOREIGN PATENT DOCUMENTS 0 549 016 A1 6/1993 (EP) .
0 679 942 A2 10/1995 (EP) .
WO 94/01975 1/1994 (WO) .

OTHER PUBLICATIONS

Publication—XP 000646127—"The UMTS Mobility Server: A Solution to Support Third Generation Mobility in ATM".
Publication—XP 000622276—Performance Evaluation of Crossover Switch Discovery Algorithms for Wireless ATM LANs.

* cited by examiner

Primary Examiner—Valencia Martin-Wallace
Assistant Examiner—Kim T. Nguyen
(74) Attorney, Agent, or Firm—Laff, Whitesel & Saret, Ltd.; J. Warren Whitesel (57) ABSTRACT

The invention concerns a directional method for a server for cells transmitted by a module attached to a local mobile area network as well as a network of this type for implementing said method.

The directional method applies to a network which is comprised of a plurality of concentration stages and terminals linked to the low-level concentration stages, said network comprising servers respectively linked to concentration stages.

This method is characterized therein that it consists of initially establishing permanent virtual channels in direction of the servers and, when a mobile is connected to two terminals of said network, said two terminals ascertain the closest common server and modify the header of the user cells transmitted by said mobile in such a way that they carry the identifier VPI/VCI of the channel established for said server so as to enable it to be processed there.

The present invention also concerns a network provided for implementing said method.

19 Claims, 4 Drawing Sheets

PROCESS OF SWITCHING TO A SERVER OF CELLS SENT BY A MODULE LINKED TO A LOCAL ACCESS NETWORK FOR MOBILE (STATIONS), AS WELL AS SUCH A NETWORK FOR IMPLEMENTATION OF SAID PROCESS

The present invention concerns a directional method to a server for cells transmitted by a module connected to a local access network as well as a network of this type for implementing said method.

BACKGROUND OF THE INVENTION

Figure 1:
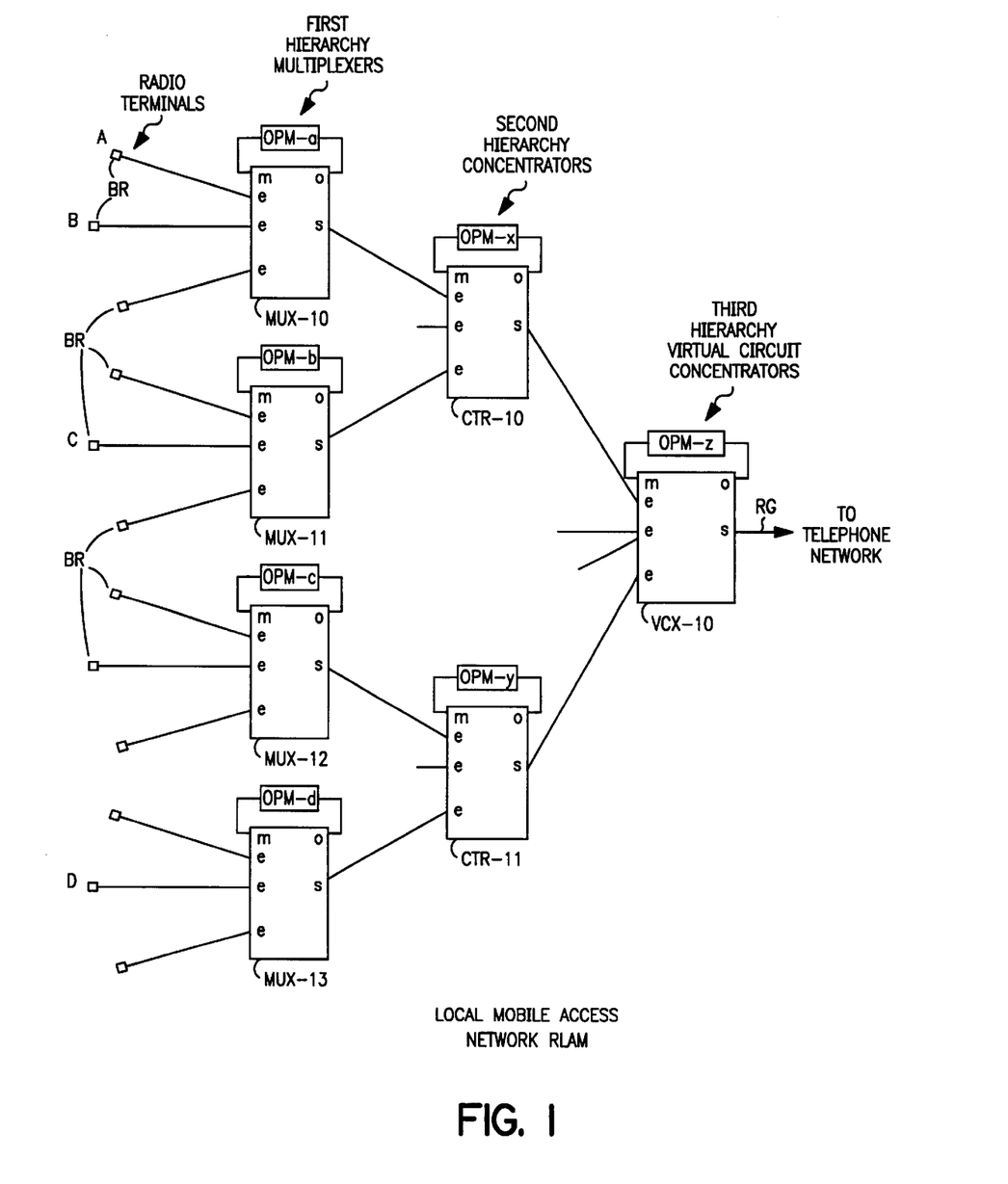
FIG. 1 is a synoptical diagram of a network to which the method of the invention may apply.

FIG. 1 shows a local mobile access network RLAM to which the present invention may be applied. This local network is comprised of a plurality of radio terminals BR each linked to an input of a multiplexer MUX-10 to MUX-13, here there are four. Each multiplexer MUX-10 to MUX 13 has its output linked to an input of a concentrator CTR-10, CTR-11 of which there are two in the network shown. Finally, each concentrator CTR-10, CTR-11 has its output linked to an input multiplex of a virtual circuit commutator VCX-10, an output multiplex of which is linked to a general network RG. Each element of the local network RLAM uses the the technology known under the name ATM (Asynchronous Transfer Mode).

A network of this type, which is given here by way of example, is a network which is fixed at three levels of hierarchy: multiplexer level, concentrator level, commutator level. It will be noted that the present invention does not only apply to networks having three hierarchy levels but also to networks having two or more than three levels of hierarchy.

In the present description, the concentration stage will be called the multiplexers MUX, the concentrators CTR and also the commutator(s) of virtual circuits VCX of the network.

In the present description, it is said that a mobile unit is linked to a local network RLAM when it passes under the radio coverage of one of the terminals BR of this network. By way of example, the coverage of such a network could be that of an average agglomeration. Always by way of example, several networks of this type can be juxtaposed to increase the geographic area covered. Thus, a regional or national network should amalgamate a more or less signifi- cant number of local access networks RLAM.

In this type of access network, the communications are managed in the commutator VCX. They can be local when they are established between mobile units linked to the local network RLAM in question, but they can also be outgoing when they are established between mobile units connected to the RLAM network in question and any terminal equip- ment of the general network RG. During its entire duration, a communication is identified in the local network by a same pair of virtual conduit and virtual channel identifiers VPI/ VCI, even when the connections are consecutively modified to the movements of the mobile unit in question.

In a network of this type, a mobile unit which is already in communication and which is thus connected to one of the terminals BR can suddenly, when it is moved, be under the coverage of a second radio terminal BR and thus be momen- tarily connected to two terminals BR. It can thus be said that this mobile unit is in an "intercell hand-over" phase. In this phase, if the user traffic links are all established toward the two terminals and the two terminals to the commutator, the information transmitted by the mobile unit is received simultaneously by the terminals BR to which it is connected, then transmitted in the local network. The mobile unit itself receives information coming simultaneously from said ter- minals BR.

In order not to unnecessarily encumber the RLAM network, it is known to use equipment whose function is to filter the flow coming from a same mobile unit in a hand- over phase and to only maintain one, generally, the one which has the best quality. The filtered flow is thus released on the network. In reality, this equipment generally operates at the level of the ATM cells even if they could be retained by the macrodiversity operation, dependent on the quality of the radio reception, alternatively or not from the ATM cells coming respectively from different terminals.

It is noted that, when a mobile unit is under the coverage of several terminals, the radio connections generally have very unequal properties.

This equipment is called an OPM macrodiversity server and its filtering function is called macrodiversity.

In a local network, an OPM server can be seen as an OPM server or as a commutation unit. In the first case, it is connected to a concentration stage, such as a multiplexer, a concentration apparatus or a commutator such that it can be placed in derivation, as the one shown in FIG. 1, even though in the second case it is cut off from an access multiplex connection to a concentrator or a commutator, like the one shown in FIG. 4.

The present invention applies to two types of OPM server.

A mobile access network RLAM should be provided with at least one OPM server located on the general access network RG, that is, at the level of the main commutator VCX of the local network, in order that the macrodiversity operation may be performed on flows coming from any terminal of the RLAM network. However, for reasons of efficiency and optimization of the occupation of resources in the local network, it may be advisable to place an OPM server at various stages of concentration, indeed at each stage of concentration.

In fact, in a network having several hierarchy levels as described above, an OPM server placed at the lower hier- archy level enables filtering of the flows from a mobile unit which would be in a hand-over phase on two terminals connected to the same concentration stage present at this point. Similarly, an OPM server placed on a higher concen- tration stage level enables filtering of the flows from a mobile unit connected to two terminals connected to all of the concentration stages at a slightly lower level.

The sequence of events which generally result during an intercell hand-over phase with macrodiversity are as fol- lows. The traffic passes up to the first terminal, called terminal A. The mobile unit in communication and con- nected to said terminal A confirms that the quality of the radio connection is better on another terminal B. It then establishes a signal channel in the RLAM local network on this new terminal B. The context of the connection is then transferred from terminal A to terminal B, i.e. information concerning the radio supports and ATM and the routing service. A user channel is then established in the local network on terminal B as a result of which the mobile traffic passes through both terminals A and B. This is the start of the macrodiversity phase. When the terminal cuts the traffic, it is the end of this phase. The user and signal channels on terminal A are then disconnected.

It is the object of the present invention to provide, in this context, a directional method for cells transmitted by a mobile unit to an OPM server for a given virtual connection.

A simple solution for solving the directional problem to an OPM server would be to consider that it will always be in service. Thus, any user traffic passing through the OPM server on condition that it separate the connections to be processed in macrodiversity and those which it agrees to let pass because they are not in a hand-over phase. Several disadvantages give reason to reject this approach. First, there is an increase in the complexity of the OPM server which is going to pass any communications in progress and which should be capable of managing a significant number of contexts. This results in a higher system cost, namely by using a significant number of memory elements. This architecture is then more sensitive to breakdowns and the consequence of an OPM server failure is that all communications are interrupted, whether they be in a hand-over phase or not. Finally, this architecture necessitates that the OPM server be placed in a commutation unit which may create problems, in particular the complexity of the system.

SUMMARY OF THE INVENTION

Different other solutions may be considered. They are generally classified into two categories. In the one, the access authorization to an OPM server is controlled by the terminals by using a specific procedure. In the other, this authorization is implicit and it is contained in the header of the traffic cells themselves.

The present invention considers an authorization which is contained in the header of the traffic cells.

The directional method according to the invention is characterized therein that it consists of initially establishing permanent virtual channels in direction of a server and, when a mobile unit is connected to two terminals of said network, said two terminals determine the the closest common server and modify the header of the user cells transmitted by said mobile unit, such that they carry the VPI/VCI identifier of the channel established for said server so that it can be processed there.

Said server is, for example, respectively connected by derivation at the concentration stages. The method of the invention thus consists of initially establishing said permanent virtual channels to the server in the concentration stages to which said server is connected.

But, said server can be respectively connected by cutting the multiplex connections when leaving the concentration stages. The method of the invention is thus characterized therein that it consists of initially establishing, in each of said servers, a permanent virtual channel to a functional unit of said server and, when said mobile unit is linked to two terminals of said network, said two terminals determine the closest common server and modify the header of the cells such that they carry the VPI/VCI identifier of the channel established to said functional unit of said server.

Advantageously, the method of the invention consists of establishing a virtual channel to each of said hierarchy levels of said concentration stages to which said servers are connected.

According to another feature of the invention, to ascertain the closest common server, each terminal to which said mobile unit is connected exchanges dialogue information with the other terminal, said information being relative to the relative localization of said two terminals in said local network. Each terminal to which said mobile unit is connected uses, in one embodiment of the invention, a table to ascertain the closest equipment server from information relating to the localization of said two terminals.

According to another embodiment of the invention, each terminal transmits said dialogue information in direction of the other terminal on a permanent signal channel which is specific to it, said other terminal ascertaining the localization of said terminal by considering the identifier of said channel carried by the cells transmitted by said terminal. Advantageously, the permanent signal channel linked to each terminal for transmitting said dialogue information carries an identifier consisting of a code of N−1 words, N being the number of hierarchy levels of the concentration stages of the network, the Jth word differentiating each concentration stage of level J linked to a same concentration stage of level J+1.

To ascertain the closest server, each terminal compares the identifier of the signal channel which is assigned to it and the identifier of the signal channel on which it has received said information from the other terminal, ascertains the word which differentiates them and, if this is the nth, ascertains the closest server as being the one which is connected to the concentration stage of level n+1.

According to another feature of the invention, from the moment when the mobile unit is connected to the two terminals up to the moment when it is again connected to a single terminal, said mobile unit inserts into the header of the user cells that it is transmitting an indicator, and said terminals to which it is connected modify the header of said cells only when said cells carry said indicator. Advantageously, the former terminal modifies the header of said cells only when it has received the message concerning said dialogue information from the new terminal. Similarly, the new terminal modifies the header of said cells only when the connection on it has been established.

The invention also concerns a local network which enables implementation of the method described above. To do so, said local mobile access network is of the type which consists of a plurality of concentration stages and terminals linked to said low-level hierarchy concentration stages, said network comprising servers respectively linked to concentration stages, said network comprising means for directing the cells which are transmitted by a mobile unit when it is connected to two terminals to a server.

A network according to the invention is characterized therein that it comprises means for initially establishing permanent virtual channels in direction of the servers and means by which said two terminals can ascertain, when a mobile unit is connected to two terminals of said network, the closest common server and to modify the header of user cells transmitted by said mobile unit such that they carry the VPI/VCI identifier of the channel established for said server so that it can be processed there.

For example, said servers are respectively linked by derivation on the concentration stages. Said network is then provided for initially establishing said permanent virtual channels to the servers in the concentration stages to which the latter are linked.

But, said servers can be respectively linked by cutting multiplex connections when leaving the concentration stages. Said network thus comprises means for initially establishing, in each of said servers, a permanent virtual channel to a functional unit of said server and means for ascertaining, when said mobile unit is connected to two terminals of said network, the closest common server and for modifying the header of the cells so that these carry the VPI/VCI identifier of the channel established to said functional unit of said server.

According to another feature of the invention, each terminal is provided for exchanging, with any other terminal of said network, dialogue information relating to the relative localization of said two terminals in said local network.

According to a first embodiment, each terminal is provided with a table to enable it to ascertain the closest server from said information received from another terminal.

For example, said servers are macrodiversity servers.

BRIEF OF DESCRIPTION OF DRAWINGS

The aforementioned features of the invention, as well as others, shall become clearer on reading the following description of an example of an embodiment, said description being made with reference to the attached drawings, among which.

If one refers to the three-level hierarchy network of FIG. 1, three cases present themselves in the macrodiversity phase.

In the first case, the mobile unit is under the coverage of terminals A and B which are both connected to the multiplexer MUX-10. The closest common OPM server is located on the OPM-a server which is at the lowest hierarchy level. The ATM cells of the user flow transmitted on each of these terminals A and B should then be directed, in a hand-over phase, on the OPM-a server. To do so, said cells will carry the pair of VPI/VCI identifiers which will enable this directing in the concentration step to which said OPM server is connected. Then, the cells filtered by the OPM server will cross the network to the commutator VCX-10 without passing through the other OPM servers, in particular the OPM-x and OPM-z servers.

In the second case, the mobile unit is under the coverage of both terminals A and C. The closest common OPM server is then the OPM-x server at the intermediate hierarchy level. The cells transmitted by terminal A will pass directly through the MUX-10 without passing through the OPM-a server and the cells transmitted by terminal C will pass directly through MUX-11 without passing through the server OPM-b. In return, the cells coming from terminals A and C will be, in concentrator CTR-10, directed to the server OPM-x. The only resultant flow will cross the VCX-10 without passing through the server OPM-z.

In the third case, the mobile unit is under the coverage of terminals A and D. The closest common OPM server is then the server OPM-z. The cells transmitted by the two terminals A and D will only pass through this server OPM-z.

It will be noted that, in this example where the network has three levels of hierarchy, it is necessary to have four channel and circuit identifiers VPI/VCI to direct all of the cells which may be transmitted. To differentiate them, it is sufficient that the circuit identifiers VCI or the channel identifiers VPI be different. If one considers that the circuit identifier VCI to which, as is known, the values are usually assigned during the phase in which the call is established, is constant for the entire duration of the communication in question, for example VCI=100, the channel identifier VPI will take four distinct values:

a first value, for example VPI=50, for the cells which are to pass through the network without macrodiversity, i.e. without passing through any OPM server. The identifier pair VPI=50, VCI=100 is consequently the one which is used to route the ATM cells in the RLAM outside of the macrodiversity situations, a second value, for example VPI=60, for the cells which are to be processed in an OPM server of a first hierarchy level, a third value, for example VPI=70, for the cells which are to be processed in an OPM server of a second hierarchy level, and a fourth value, for example VPI=80, for the cells which are to be processed in an OPM server of the third hierarchy level.

Generally, it is necessary to have N+1 channel and circuit identifier pairs VPI/VCI for a network which is composed of N hierarchy levels. A different value is assigned to each hierarchy level and another value is assigned to the cells which are to cross the network without passing through an OPM server.

According to one feature of the invention, The N+1 identifier values VPi are the same for all communications established in the local network. It is confirmed that this condition does not represent a constraint for the management of communications in an RLAM.

Thus, the method of the invention necessitates an initial configuration of the network which is carried out when it starts or, perhaps, as a result of modifications to its physical architecture. This configuration consists of constructing all of the permanent channels which will enable all mobile units to be able to access the correct OPM server when necessary. This construction is realized by marking each concentration stage.

If one refers to the network with three hierarchy levels as shown in FIG. 1, the permanent connections to be established at the level of each concentration stage are described below.

In the multiplexers MUX-10, 11, 12 and 13, all of the inputs e of a multiplexer will be marked to its output s for the virtual channel and circuit identifier pairs VPI/VCI when the identifier VPI corresponds either to the identifier VPI assigned to the OPM server with a second hierarchy level, here VPI=70, or to the identifier VPI assigned to the OPM server of the third level, here VPI=80.

The corresponding VPI/VCI identifier pairs are expressed by the same respective pairs. Thus, the pairs 70/x and 80/x in the aforementioned example, where the second number x represents all the values which the virtual circuit identifier VCI may have, i.e. all of the values which may be assigned to any communication, are respectively shown as 70/x and 80/x.

All of the inputs e of a multiplexer to its output o linked to the OPM server will also be marked for the identifier pairs VPI/VCI when the identifier VPI is the one which is assigned to the OPM server of the first level, here VPI=60. There, the corresponding identifier pair, here 60/x, is shown as a pair VPI/VCI, where the identifier VPI is the one which is assigned to the cells which are not in a macrodiversity phase, here 50/x.

It will be noted that, taking this fact into consideration, the cells will leave the multiplexer of a low hierarchy level with a header which will no longer direct them to another OPM server and that this will be the same for all stages of the network.

The input m of a multiplexer to which the output of the OPM server is linked will still be marked toward the output s of this multiplexer for the identifier pair VPI/VCI, where the identifier VPI is the one which is usually assigned to the cells which are not in a macrodiversity phase, here 50/x. Thei identifier pair is expressed in itself, i.e. 50/x.

Similarly, in the concentrators CTR-10 and 11, all of the inputs e of a concentrator will be marked toward its output s for the identifier pair VPI/VCI corresponding to the OPM server of the third level, here 80/x. This is expressed in itself, i.e. 80/x.

All of the inputs will also be marked to the output o on which the OMP server of the second level is connected for the identifier couple corresponding to the OPM server of the second level, here 70/x. This identifier pair is expressed in the identifier pair given to the cells which should not pass through an OPM server, i.e. here 50/x.

The input m on which the output of the OPM server of the second level is connected is also marked toward the output s for the identifier pair corresponding to the cells which are not in a macrodiversity phase. This identifier pair, here 50/x, is expressed in itself, i.e. 50/x.

Finally, in the commutator VCX-10, all of the inputs e are marked toward the output o to which the input of the OPM server of the third level is linked for the identifier pair of which the identifier VPI is the one which is assigned to the third level, here 80/x. This pair is expressed in the identifier pair given to the cells which should not pass through an OPM server, i.e. 50/x here. Similarly, always in the commutator VCX-10, the input m to which the output of the OPM server is connected is marked for the identifier pair given to the cells which should not pass through an OPM server, here 50/x. This identifier pair is expressed in itself, i.e. 50/x.

It will be noted that a reconfiguration of the consecutive network, for example to the addition of a new multiplexing stage, will necessitate establishing permanent channels, as described above, in this new multiplexer.

We shall now describe the sequence of operations for a communication established in the network with three hierarchy levels described above and by considering the marking examples also described above.

First, the call establishment phase will be considered. It will be recalled that the value of the identifier VCI, which is assigned to a given communication is constant for the entire duration of the call, and that, hypothetically, it also retains this value in the entire local network, from terminal A to which the mobile unit is connected to the concentration element with the highest hierarchy level, namely commutator VCX-10.

To make the description clear, we are going to consider, by way of example only, that the communication is assigned an identifier VCI having the value 100.

As is conventional in the field of the present invention, the phase for establishing a call consists of marking a virtual connection in the various stages of concentration of terminal A, to which the mobile unit is connected, up to an output of the commutator VCX-10. This connection will carry, in the example under consideration here, the virtual channel VPI=50 and virtual circuit VCI=100 identifiers. It will be recalled that, hypothetically, the identifier VPI=50 is assigned to the cells which should not pass through an OPM server, i.e. the cells which are not in a macrodiversity phase.

For example, a mobile communication connected to terminal A toward the general network RG necessitates the marking operations consisting of an input e toward the output o of each concentration stage MUX-10, CTR-10 and VCX-10, in the expression of from 50/100 to 50/100.

It will now be supposed that the mobile passes under the coverage of another terminal C. The communication then passes temporarily in a hand-over phase between the terminals A and C.

A signal channel and a user traffic channel are thus going to be marked from terminal C. The signal channel will enable the mobile unit to carry on a dialogue with the network while the user channel will enable it to route its user traffic from the new terminal C. The object of the dialogue is to communicate the value of the virtual circuit VCI identifier (100 in our example) assigned to the communication and to also furnish the relative localization of the new terminal C vis-à-vis the former one A to the mobile unit. As will be understood from the following, this latter information will be used to ascertain the value of the virtual channel identifier VPI which should be assigned to the communication to enable the user cells to be sent, during the macrodiversity phase, through the closest common OPM server. The value of the identifier VCI of the user traffic is, with respect to it, the one which is assigned to the communication.

At the end of the dialogue, the following markings are made from the terminal C.

In the multiplexer MUX-11, the marking of the input e, which is connected to terminal C toward output s, is made for the identifier VPI corresponding to the identifier used for the cells which are not in a macrodiversity phase, namely 50. Similarly, in the concentrator CTR-10, the marking of the input e, linked to the multiplexer MUX-11, to the output s is made for the same identifier VPI=50. On the other hand, there is no new marking in the commutator VCX-10.

During the macrodiversity phase, an indicator M is inserted by the mobile unit into the header of the cells of the user flow. The function of this is to indicate to the radio receiver terminals BR that they should modify the header of the ATM cells, i.e. more precisely, the contents of the virtual channel and circuit identifiers VPI/VCI, so that said cells are rerouted from their normal path in the network to be directed toward the closest common OPM server.

Thus, after they have pass through the one or the other of the terminals A and C, the cells of the user flow should carry an identifier VPI whose value is the one assigned to the closest common OPM server in order to be able to pass through it. It will be understood that, in the example given above, the identifier VPI to be selected is the one which is assigned to the concentration stages of the second level, i.e. 70.

The problem which arises is the one which requires that the terminals A and C must know the identifier VPI which will be used to direct the cells of the communication in question to the closest common OPM server.

According to a first solution to this particular problem, a localized table in each terminal describes the topology of the network and is used by the latter to ascertain the intended common OPM server. Knowing the physical identity of the multiplexers to which each is connected, i.e. multiplexer MUX-10 for terminal A and multiplexer MUX-11 for terminal C, each of the two terminals A and C is able to deduce therefrom the closest common concentration stage to which an OPM server is connected. This solution necessitates the use of shared tables which can be updated relatively fastidiously.

Another solution is also proposed by the present invention.

It consists of constructing several common channels carrying specific virtual channel identifiers VPI for concentration equipment of a lower hierarchical level, here the multiplexers MUX-10 to MUX-13, said channels being used by each network terminal to carry on dialogue with another terminal mentioned above. The message cells transmitted by these channels carry the identifier VPI reserved for the concentration equipment to which the terminal transmitting said cell and the identifier VCI reserved for the signal channel assigned to the mobile unit is attached. Thus, for a terminal, the comparison betweeen the channel identifier VPI which is assigned to the concentration stage to which it is connected and the one which is assigned to the dialogue message which it receives from another terminal enables it to deduce it from the hierarchy level of the common OPM server to be addressed.

For example, the identifier VPI=000 is assigned to the common channel which the terminals connected to multiplexer MUX-10 use, the identifier VPI=001 is assigned to the multiplexer MUX-11, identifier VPI=010 is assigned to multiplexer MUX-12, identifier VPI=011 is assigned to multiplexer MUX-13. For terminal A, the comparison between the identifier VPI=000, which is assigned to the multiplexer MUX-10 to which it is connected, and the identifier VPI=001 assigned to the dialogue message which it receives from terminal C linked to the multiplexer MUX-11, enables one to deduce that the closest common concentration stage is the concentrator CTR-10.

Let us consider other examples.

Case 1: terminal B, which is connected to the multiplexer MUX-10 to which identifier VPI=000 is assigned, receives a dialogue message with the identifier VPI=000. It can then deduce therefrom that the source terminal is connected to the same multiplexer MUX-10 and that the closest common OPM server is the server OPM-a. Consequently, the identifier VPI to be used for the user cells during the macrodiversity phase is the identifier of the virtual conduit assigned to the low-level concentration stages, i.e. in the case of the aforementioned example, identifier VPI=60.

It will be noted that the same value of identifier VPI=60 will be given when the two conversing terminals are connected to the same multiplexer, for example MUX-11, MUX-12 and MUX-13. Thus, the equality of the dialogue identifiers VPI means that the user cells should carry the identifier VPI=60 and that the intended common OPM user is at the lowest hierarchy level.

Case 2: terminal C, which is connected to the multiplexer MUX-11 to which identifier VPI=001 is assigned, receives a dialogue message with the identifier VPI=000. It can then deduce therefrom that the source terminal of said message is connected to the same multiplexer MUX-10 and that the closest common concentration stage is the concentrator of the second hierarchy level, i.e. the concentrator CTR-10 here. Thus, the identifier VPI assigned to the user cells during the macrodiversity phase is the identifier assigned to the concentration stages of the second hierarchy level, i.e. in the above-noted case, the identifier VPI=70. The user cells carrying this identifier will then be directed to the closest common OPM server which is then the server OPM-x.

Case 3: terminal D, which is connected to the multiplexer MTX-13 to which identifier VPI=010 is assigned, receives a message with the identifier VPI=000. It can ascertain the identifier VPI assigned to the user cells during the macrodiversity phase which should be the identifier assigned to the concentration stages of the third hierarchy level, i.e. in the above case, the identifier VPI=80. The same is true if terminal D had received a message carrying the identifier VPI=000. Thus, the user cells carrying this identifier will then be directed to the closest common OPM server which is then the server OPM-z linked to the commutator VCX-10.

Case 4: terminal A receives a message with the identifier VPI=010. As previously noted, the user cells will carry an identifier VPI=80 during the macrodiversity phase.

Figure 2:
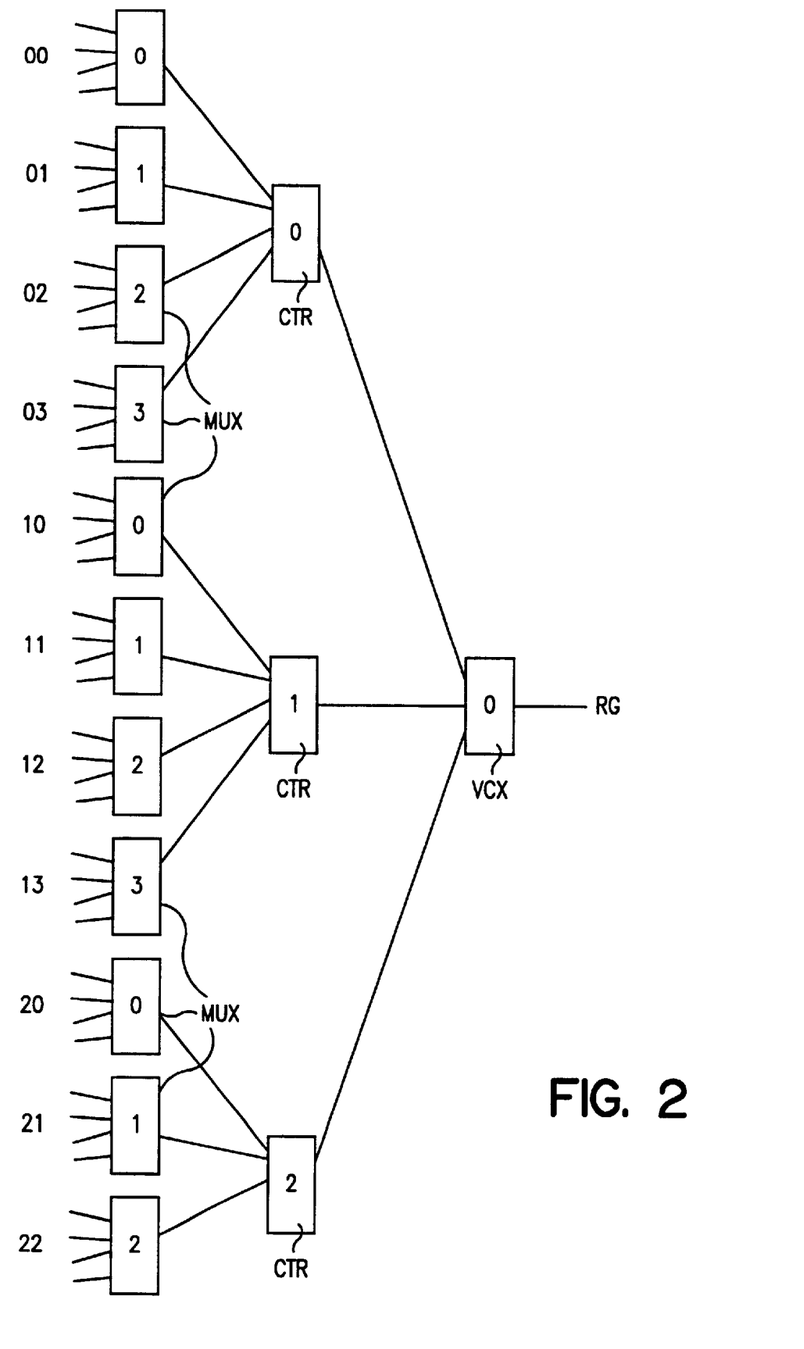
FIG. 2 is a diagram of a network showing the assignment of identifiers for signal channels to different concentration stages of a network having three hierarchy levels.

The present invention proposes to assign virtual channel identifiers VPI of the commun dialogue channels in the following manner, which is described with reference to FIG. 2, for a network having three hierarchy levels.

For such a network with three levels, each identifier VPI is a two-figure code: the first represents a number which differentiates each concentration stage of the first level linked to a same stage of concentration of a second level and the second one represents a number which differentiates each concentration stage of the second level linked to the same concentration stage of the third level.

It will be noted that the figures in question here can be expressed as a 10-based number, but also on any other basis. Generally, these are words which make it possible to differentiate each concentration stage which is of a given hierarchy level and which is linked to a same stage of concentration of a hierarchy level just above it.

Generally, for a network having N levels of hierarchy, the identifier is a code having N−1 words. The Jth word differentiates each concentration stage from level J connected to a same stage of concentration of J+1 level.

Figure 4:
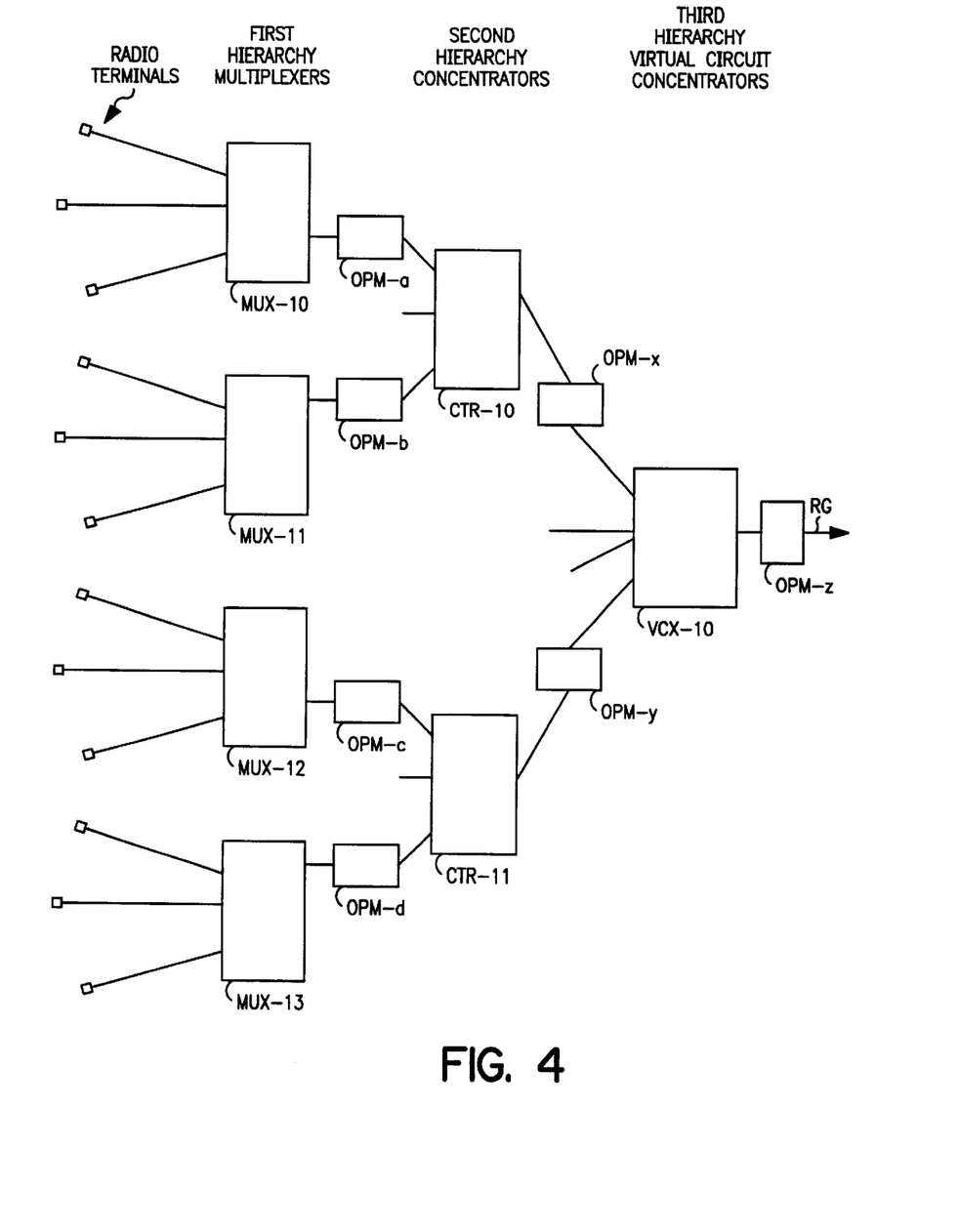
FIG. 4 is a variant of the embodiment of a network according to the invention.

By way of example, the implementation of this method in the case of a network having three stages of concentration can be seen in FIG. 4.

To allocate the identifier VPI to the user cells in the macrodiversity phase, the following method can then be applied:

1) If the identifier VPI received by a terminal is identical to the one which is assigned to the concentration stage to which it is linked, the closest common OPM server is the one which corresponds to the first hierarchy level, i.e. in the aforementioned example, VPI=60.
2) If the identifier VPI received differs by the number or the word of units, the closest common OPM server is the one which corresponds to the second hierarchy level, i.e., in the aforementioned example, VPI=70.
3.

If the identifier VPI differs by the number or the word of tens, the closest common OPM server is the one of the third hierarchy level, i.e. VPI=80.

It will be noted that, to be able to implement the method described above, it suffices that the numbers, figures or words differentiate each stage of concentration of a same level.

Generally, if the identifier VPI differs by the Nth number or word, the closest common OPM server is the one of level N+1, it being understood that N=0 when the two identifiers VPI are equal.

In practice, one can operate in the following manner. The former terminal validates indicator M from which it received the request message for the context coming from the new terminal, Then, at that moment, the cells transmitted by the mobile unit pass through one of the OPM servers of the network, as indicated above. Nevertheless, the OPM server in question will only receive a single flow coming from the mobile unit at this point.

With respect to the new terminal, it validates the indicator M from the marking of the connection on which it was performed. It actually starts the macrodiversity phase. As was explained above, the flow of user cells coming respectively from the former and new terminals then passes through a single OPM server of the network where it leaves again in a single filtered flow.

The end of the macrodiversity phase will be ascertained by the mobile unit when the latter completes the hand-over phase and abandons one of the two terminals, generally the former terminal. It simultaneously deletes the indicator M. The terminals reflect this suppression of M back to the headers of the ATM cells by again assigning the standard value outside of the macrodiversity to the identifier pair VPI/VCI, i.e. 50/100 for the example described above.

It will be noted that the activation of an OPM server for a given connection should be carried out prior to the user flow being transmitted by the new terminal. The likelihood that two flowes of a same communication can thus be transmitted without control of the macrodiversity is thus avoided, which can then lead to damaging the quality of the communication.

Similarly, it is indispensable that the deactivation command be given after the user flow has been cut on the former terminal.

The result of this is that the OPM server should be capable of functioning normally in the presence of a single user flow coming from a mobile unit.

The method described concerns an architecture with three hierarchy levels, but it is understood that it can be transposed for simpler network architectures, for example with 2 hierarchy levels, and comprising only one OPM server.

It will be noted that in view of control methods for activation/deactivation by specific procedures, the method of the invention presents advantages with respect to performance and reliability.

Figure 3:
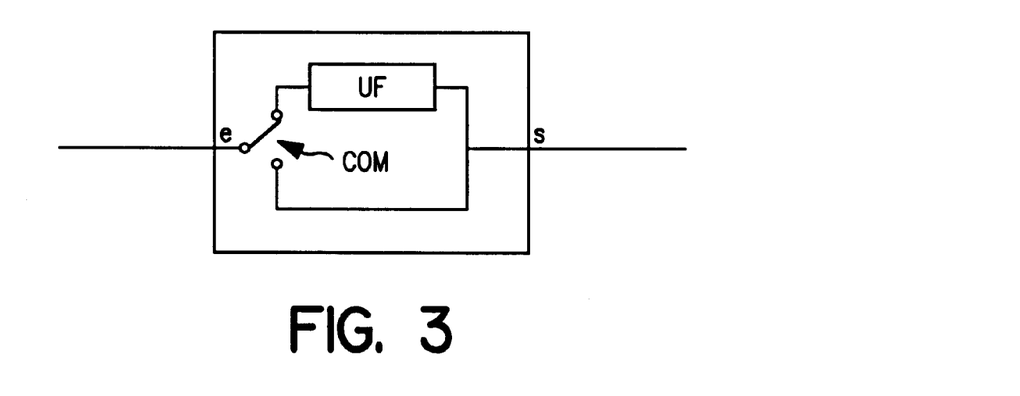
FIG. 3 is a diagram of a server which is to be used by cutting a multiplex connection.

The present invention also applies to OPM servers which are commutation units. An operator of this type is shown in FIG. 3. An input e and an output s, between which there is a commutator COM and a functional unit UF, here the macrodiversity processing, is provided.

The functioning of an OPM server of this type within the scope of the present invention is as follows. A virtual conduit identifier VPI is assigned to this OPM server. While the user cells which are present at the input e carry a virtual conduit identifier VPI which is different from the one which is assigned to the OPM server, the commutator COM is positioned such that the input e is linked to the output s, even when said cells are located at output s.

When said cells carry the virtual conduit identifier corresponding to the one which is assigned to the OPM server, the commutator COM directs them to the functional unit UF. After processing, the cells are directed toward the output s of the OPM server.

In addition to this processing, the virtual conduit identifier of the user cells is expressed in the value generally assigned to the cells which are not subjected to macrodiversity processing, for example VPI=50.

In the macrodiversity phase, two user flows are directed to the functional unit UF. Only the one which has the better quality is present at the output of the functional unit UF.

A local mobile access network is shown which is equipped with servers OPM-a to OPM-z of the commutation type unit. It can be seen that each OPM server is connected in a cut of a multiplex connection between a concentration stage of a first level of hierarchy and another concentration stage of the level just above it. It will be understood that the invention also applies to a network of this kind by looking for, during the hand-over phase, the OPM server which is the closest common one to the two terminals to which the mobile unit is connected. Here, the OPM server in question is not the one which is linked by derivation to a concentration stage, as in the first embodiment of the invention, but the OPM server which, in a cut of the multiplex connections, is linked to the output of said concentration stage.

It will be noted that the function actually carried out by an OPM server is insignificant from a point of view of the concept of the invention and that the invention therefore also applies to any type of servers capable of simultaneously processing two flows coming from a same mobile unit connected to two distinct terminals.

What is claimed is:

1. A method for transmitting user's cells from terminals to a switch stage of a local access network during a handover phase while a mobile unit is simultaneously in an area under coverage of two terminals,
   said network comprising terminals, concentration stages and a switch stage arranged in levels of hierarchy, means for linking said terminals to inputs of the concentration stages at a low hierarchical level and for linking outputs of the concentration stages at a high hierarchical level to said switch stage,
   means for identifying a VPI/VCI for each communication that is allocated to a mobile user's cells during a call phase,
   said method including the steps of:
      providing said network with servers associated with some of said concentration stages and said switch stage, said servers processing the flow of cells respectively emitted simultaneously by two terminals serving a coverage area in which a mobile unit is then located and for outputting one processed flow of cells,
      establishing a permanent virtual channel with a particular VPI identifier for each of said servers, and
      a plurality of steps carried out when a mobile unit already in communication moves into an area simultaneously served by two terminals of said network, as follows:
   determining the common server closest to said terminals,
   modifying the identifier VPI/VCI of the user's cells in the flows of cells emitted by said terminals, said modified identifier being the identifier of the permanent virtual channel of said determined common server so that cells emitted by both terminals can be processed in said server,
   and re-allocating the initial user's cells identifier VPI/VCI of the cells of the server output flow so that processed cells can be directed to said switch stage.

2. A method according to claim 1 further comprising the step of initially establishing permanent virtual channels to the servers associated with concentration stages to which said servers are linked.

3. A method according to claim 1 wherein said servers are respectively linked by multiplex connections leaving the concentration stages, and further steps wherein in each of said servers initially establish a permanent virtual channel extending to a functional unit of said server, and determining the closest common server when said mobile unit is connected to two terminals, and modifying the header of the cells in such a way that they carry the VPI/VCI identifier of the established channel to a function unit of said server.

4. A method according to claim 1 further comprising the step of establishing a virtual channel to each of a plurality of said hierarchy levels of said concentration stages to which said servers are linked.

5. A method according to claim 4 further comprising the step of connecting said mobile unit to exchange dialogue information with the terminals, said information relating to the relative localization of said two terminals in said local network.

6. A method according to claim 5 further comprising the step wherein each of said two terminals transmits information to the other terminal on a permanent signal channel which is specific to it, said other terminal ascertaining the localization of said transmitting terminal responsive to the identifier of said channel carried by the cells transmitted by said terminal.

7. A method according to claim 6 wherein the permanent signal channel connected to each terminal for a transmission of said information carries an identifier consisting of a code having N−1 words, N being the number of hierarchy levels of said concentration stages of the network, and a Jrd word differentiating each concentration stage of the Jrd level linked to a same concentration stage of level J+1.

8. A method according to claim 7 further comprising the step of ascertaining the closest server, each terminal comparing the identifier of the signal channel which is assigned to it and the identifier of the signal channel on which it received said information from the other terminal, determining the word which differentiates channels and, if it is the nth word, ascertaining the closest server as being the one which is linked to the concentration stage of level N+1.

9. A method according to claim 5 further comprising the step wherein each terminal to which said mobile unit is connected uses a look up table to ascertain the closest server in response to the information relating to the location of said two terminals.

10. A method according to claim 1 further comprising the step of starting from the moment when the mobile unit is connected to said two terminals and continuing up to the moment when the mobile unit is again connected to a single terminal, and the further step comprises inserting an indicator into a header of the user cells that is transmitting and said terminals to which said mobile user is connected modifying the header of said cells only while said cells carry said inserted indicator.

11. A method according to claim 10 further comprising a step wherein an original terminal modifies the header of said cells only when it has received the message concerning said information from the new terminal.

12. A method according to claim 11 further comprising a step wherein the new terminal modifies the header of said cells only when a connection based on it has been made.

13. A method according to claim 1 wherein said servers are macrodiversity servers.

14. A local access network for mobile telephones, said network comprising terminals, concentration stages and a switch stage arranged in successive levels of hierarchy, said terminals being linked to the inputs of the concentration stages in a low level hierarchy and the outputs of concentration stages in a high level hierarchy being linked to said switch stage, a VPI/VCI identifier means for each communication then allocated to a mobile user's cells during a call phase, said network comprising server means associated with at least some of said concentration stages and said switch stage, said server means processing a flow of cells respectively emitted simultaneously by two terminals serving an area under a coverage in which a mobile unit is then located and for outputting one processed flow of cells, means comprising a permanent virtual channel with a particular VPI identifier being provided by said server, said network comprising means for determining which common server is closest to said terminals when a mobile unit already in communication is simultaneously connected to two terminals of said network, means for modifying the VPI/VCI identifier of the user's cells in the flow of the cells emitted by said terminals, the modified identifier becoming the identifier of the permanent virtual channel of said determined common server, whereby cells emitted by both terminals are in said determined common server, and means for thereafter reallocating the initial VPI/VCI identifier of the user's cells in the server output flow of cells so that processed cells can be directed to said switch stage.

15. A network according to claim 14 wherein said servers are respectively linked to the concentration stages and means for initially establishing said permanent virtual channels to the servers in the concentration stages to which the servers are linked.

16. A network according to claim 14 wherein said servers are respectively linked by a multiplex connection when leaving the concentration stages; and said multiplex connection comprises means in each of said servers for initially establishing a permanent virtual channel extending to a functional unit of said server, means responsive to said mobile unit being connected simultaneously to two terminals of said network for ascertaining the closest common server and for modifying the header of the cells to carry the identifier VPI/VCI of the established channel to said functional unit of said closest server.

17. A network according to claim 14 wherein each terminal includes dialogue information for exchanging with any other terminal of said network, the dialogue information relating to the relative localization of said two terminals in said local network.

18. A network according to claim 14 wherein each terminal has a look up table for making it possible to ascertain the closest server in response to said information received from another terminal.

19. A network according to claim 14 wherein said servers are macrodiversity servers.

* * * * *